(12) United States Patent
Valtanen

(10) Patent No.: US 8,804,679 B2
(45) Date of Patent: Aug. 12, 2014

(54) METHOD AND APPARATUS FOR DATA TRANSFER WITH SIGNALING

(75) Inventor: Juha Valtanen, Oulu (FI)

(73) Assignee: Elektrobit Wireless Communications, Oulu (FI)

( * ) Notice: Subject to any disclaimer, the term of this patent is extended or adjusted under 35 U.S.C. 154(b) by 806 days.

(21) Appl. No.: 12/270,169

(22) Filed: Nov. 13, 2008

(65) Prior Publication Data

US 2010/0118763 A1    May 13, 2010

(51) Int. Cl.
| | | |
|---|---|---|
| H04W 4/00 | (2009.01) | |
| H04W 84/18 | (2009.01) | |
| H04B 7/185 | (2006.01) | |
| H04L 12/56 | (2006.01) | |
| H04W 88/04 | (2009.01) | |

(52) U.S. Cl.
CPC ............... *H04W 84/18* (2013.01); *H04L 45/26* (2013.01); *H04W 88/04* (2013.01); *H04B 7/18589* (2013.01)
USPC ........ 370/338; 370/236; 370/389; 370/395.2; 370/466

(58) Field of Classification Search
CPC ...................................................... H04W 4/00
USPC .......................................................... 370/338
See application file for complete search history.

(56) References Cited

U.S. PATENT DOCUMENTS

| | | | |
|---|---|---|---|
| 5,519,699 A * | 5/1996 | Ohsawa ........................ | 370/231 |
| 6,359,882 B1 * | 3/2002 | Robles et al. ................. | 370/389 |
| 6,587,435 B1 * | 7/2003 | Miyake et al. ................ | 370/236 |
| 7,089,027 B1 * | 8/2006 | Welch et al. .................. | 455/521 |
| 2003/0129991 A1 | 7/2003 | Allison et al. | |
| 2006/0002327 A1 | 1/2006 | Kallio et al. | |
| 2007/0058549 A1 | 3/2007 | Speks et al. | |
| 2007/0058626 A1 | 3/2007 | Keller et al. | |
| 2008/0013544 A1 * | 1/2008 | Ginde et al. ............. | 370/395.21 |

OTHER PUBLICATIONS

"Understanding Delay in Packet Voice Networks," Document ID: 5125, http://www.cisco.com/en/US/tech/tk652/tk698/technologies_white_paper09186a00800a89, 12 pages (undated).

* cited by examiner

*Primary Examiner* — Ayaz Sheikh
*Assistant Examiner* — Hai-Chang Hsiung
(74) *Attorney, Agent, or Firm* — Hoffmann & Baron, LLP

(57) ABSTRACT

A radio system comprises a transmitter, an intermediate station, and a receiver for data transfer from the transmitter to the receiver. The intermediate station receives at least one data packet addressed to the receiver from the transmitter, transmits each data packet to the receiver, and performs signaling of the receiver to the transmitter in conjunction with the data transfer.

21 Claims, 4 Drawing Sheets

METHOD AND APPARATUS FOR DATA TRANSFER WITH SIGNALING

BACKGROUND OF THE INVENTION

1. Field of the Invention

The invention relates to data transfer with signaling.

2. Description of the Related Art

Signaling data is transferred through a network between, for example, two user terminals for setting up, maintaining and tearing down a connection of actual data transfer. The signaling data is used to negotiate possible data transfer protocols, data compression methods, reservation of bandwidth, handshaking at the end, etc. In a packet-switched mode, signaling data also comprises acknowledgement messages of received data packets during data transfer. If a connection, such as a satellite connection or an ad-hoc radio link, has a long or undetermined delay, the messaging roundtrip time between the two user terminals retards the start of the actual data transfer substantially. Correspondingly, the acknowledgement messages associated with the data packets decrease the data rate significantly. The delay may extend up to a second or even dozens of seconds which has a negative effect on the user experience. Hence, there is a need for a better data transfer method.

SUMMARY OF THE INVENTION

An object of the invention is to provide improved signaling. According to an aspect of the invention, there is provided a data transfer method. The method comprises transferring at least one data packet from a transmitter to a receiver through an intermediate station; performing signaling of the receiver to the transmitter by the intermediate station in conjunction with data transfer.

According to another aspect of the invention, there is provided an intermediate station in a radio system. The intermediate station is configured to convey at least one data packet of a data transfer between a transmitter and a receiver, and perform signaling of the receiver to the transmitter in conjunction with data transfer.

According to another aspect of the invention, there is provided a receiver in a radio system. A receiver in a data transfer of at least one data packet from a transmitter through an intermediate station is configured to transmit information on itself to the intermediate station, the information being for performing signaling of the receiver to the transmitter in conjunction with data transfer.

According to another aspect of the invention, there is provided a radio system. The radio system comprises a transmitter, an intermediate station, and a receiver for a data transfer from the transmitter to the receiver; and the intermediate station being configured to receive at least one data packet addressed to the receiver from the transmitter, transmit each data packet to the receiver, and perform signaling of the receiver to the transmitter in conjunction with the data transfer.

According to another aspect of the invention, there is provided a computer program distribution medium readable by a computer and encoding a computer program of instructions for executing a computer process for signaling associated with a data transfer between a transmitter to a receiver through an intermediate station. The computer process comprises: emulating signaling of the receiver to the transmitter by the intermediate station in conjunction with data transfer of at least one data packet from the transmitter to the receiver through the intermediate station.

The invention provides several advantages. The delay associated with signaling at the beginning, during and/or at the end of the data transfer is short which enables a fast data transfer.

BRIEF DESCRIPTION OF THE DRAWINGS

In the following, the invention will be described in greater detail with reference to the embodiments and the accompanying drawings, in which.

DETAILED DESCRIPTION OF THE EMBODIMENTS

Figure 1A:
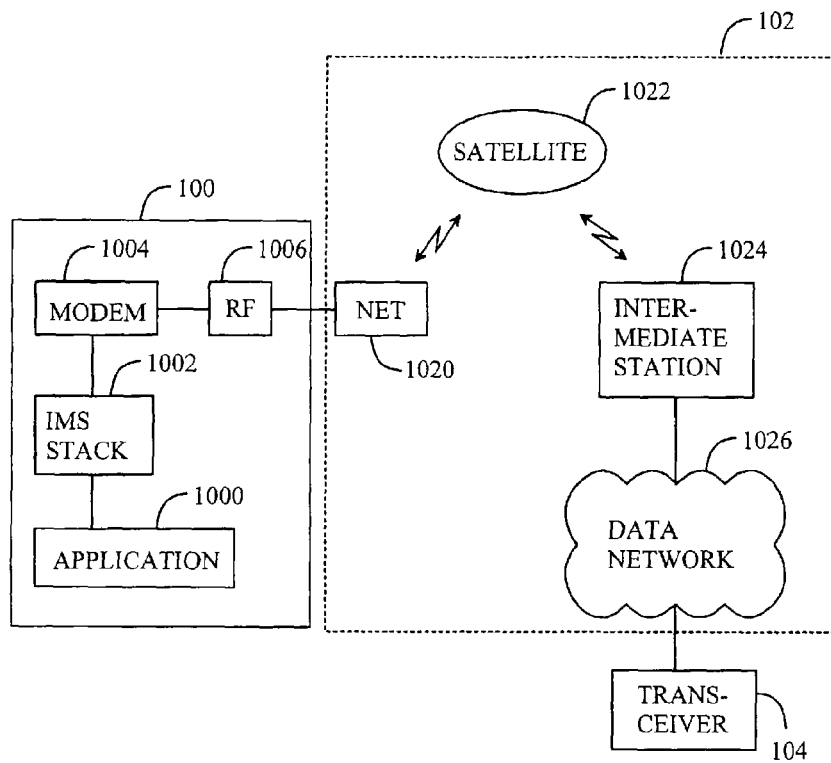
FIG. 1A shows a radio system with a long roundtrip delay.

With reference to FIG. 1A, examine an example of a data transfer according to the prior art. Assume now that the data transfer session is a VoIP (Voice-over-Internet Protocol) call using IMS (IP Multimedia Subsystem) with SIP (Session Initiation Protocol) signaling. A user of a transceiver 100 may start a VoIP call through a network 102 to another transceiver 104. The application layer 1000 is a level in an OSI (Open Systems Interconnection) model, and it is closest to the user. The application layer 1000 may be a part of or in connection with a user interface. The application may be a computer program.

During a call initiation, an IMS stack 1002 may send several SIP messages addressed to the transceiver 104. The IMS stack 1002 feeds the SIP messages to a modem 1004 which mixes the SIP messages up to RF (Radio Frequency) signals. The SIP messages in the RF domain may propagate to an output 1006 which may transmit the SIP messages to a terrestrial network 1020. The terrestrial network 1020 transmits the SIP messages to a satellite 1022 which conveys the SIP messages down to a terrestrial base station 1024. The base station 1024 may transmit the SIP messages through a data network 1026 such as an IP network to the transceiver 104. After the transceiver 104 has received a SIP message the transceiver 104 transmits a response to the transceiver 100 through the network 102. Usually, except the first SIP message, a SIP message is transmitted from the transceiver 100 only after a response from the transceiver 104 to a previous SIP message is received which is a reason to a latency problem in the VoIP, for example.

During the VoIP call, the user of the transceiver 100 may be called to participate in a conference call, for instance. To put up a conference call requires sending, receiving and acknowledging several SIP messages one after another between the transceivers 100, 104 through the network 102. Because of the messaging delays particularly in the network 102 this will take a long time.

Figure 1B:
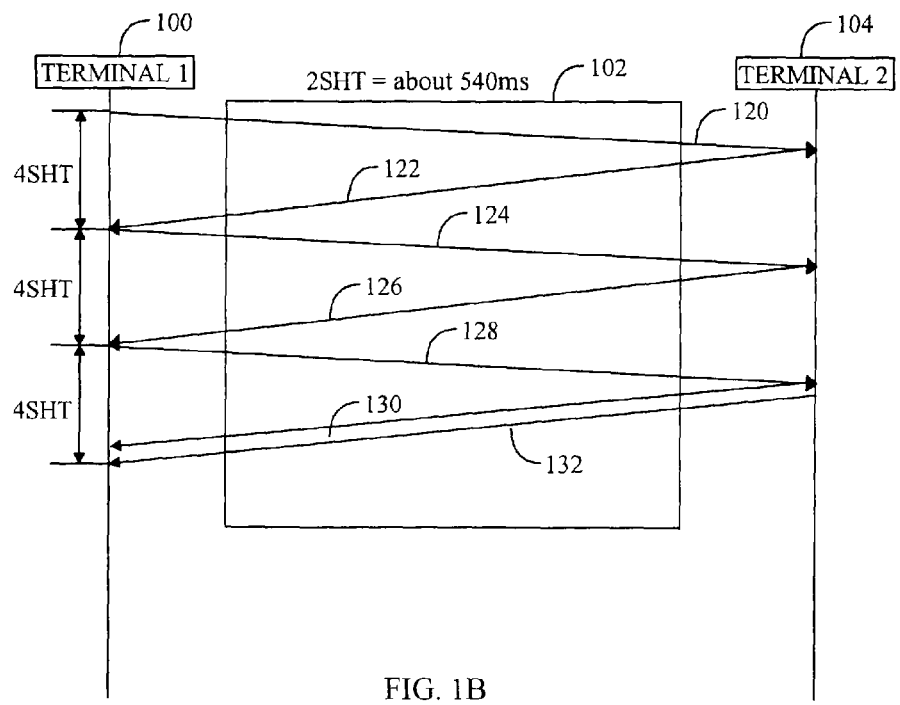
FIG. 1B shows a signaling chart of two terminals through a satellite connection.

FIG. 1B shows a signaling chart between two subscriber terminals (transceivers 100, 104) through a satellite connection. In this example, a transceiver 100 may initiate a VoIP call by transmitting an invitation message 120 through a network 102 including a satellite connection to a transceiver 104. The transceiver 104 may respond to the initiation message 120 if it receives it by transmitting a session progress message 122, such as SIP 183 session progress message which may disable a local alerting, for example. The transceiver 100 may continue by transmitting a PRACK (Provisional Response Acknowledgement) message 124 which the transceiver 104 may accept by transmitting a response PRACK message 126. During that, a PDP (Packet Data Protocol) context may be activated between the transceiver 100 and the network 102. Then, the transceiver 100 may transmit an update message 128, to which the transceiver 104 may respond by transmitting an accept message 130. The transceiver 104 may also then transmit a ringing message 132 which may include information on SDP (Session Description Protocol), for example. All this messaging may take about 12*SHT (Single Hop Time).

Assume now that SHT, i.e. one trip between the terrestrial network 1020 or the base station 1024 and the satellite 1022, is about 270 ms, which is a realistic value if the satellite 1022 is in a geostationary orbit. Thus, the time that it takes to travel from the first transceiver 100 to the second transceiver 104 is about 540 ms. Then a SIP transaction which includes a transmission of a SIP message and a reception of a response to the SIP message takes about 1080 ms. Hence, each PDP of a context activation exchange takes double time of the SIP transaction plus some processing time. As a result, a PDD (Post Dial Delay) component may last about 3.2 s. A total PDD of a satellite call is often 9 s to 13 s which can be considered as a rather negative experience for a user.

Such long delays take place any time when signaling is performed between the transceivers 100, 104, the signaling including transmitting some signaling data from the first transceiver 104 (100) to the second transceiver 100 (104) and transmitting response data to the signaling data from the second transceiver 100 (104) to the first transceiver 104 (100).

Figure 2:
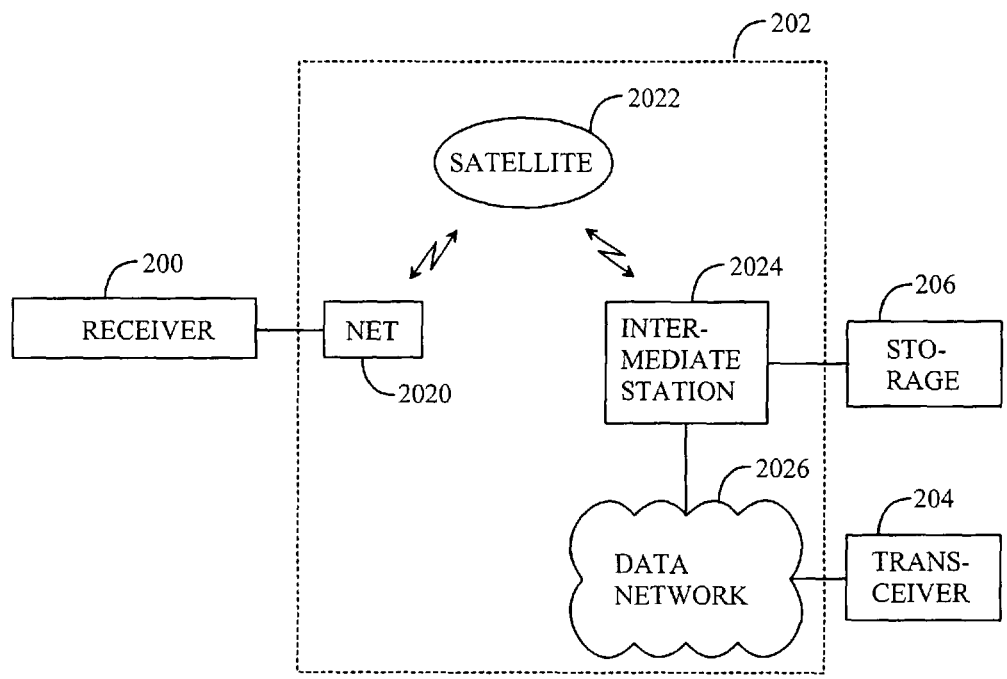
FIG. 2 illustrates a radio system with a shorter roundtrip delay.

FIG. 2 shows a radio system which has a solution to shorten the delays. A receiver 200 may be a transceiver which receives data packets from a transmitter 204. The transmitter 204 may also be a transceiver which transmits data packets to the receiver 200. The receiver 200 may transmit information on itself to an intermediate station 2024. Alternatively, the intermediate station 2024 may receive the information on the receiver 200 from a storage 206 including information on at least one receiver. The storage 206 may be a data bank in the radio system and it may have a wired or wireless connection to the intermediate station 2024.

During transmission the information on the receiver 200 may propagate from the receiver 200 to a terrestrial network 2020 which transmits the information up to a satellite 2022. The satellite 2022, in turn, transmits the information down to the intermediate station 2024 on earth.

The terrestrial network 2020 is not necessarily needed but the receiver 200 may have a direct RF connection to the satellite 2022.

The receiver 200 and the transmitter 204 may be subscriber terminals in a radio system, for example.

The information may include an identity of the receiver 200. The identity may be IMEI (International Mobile Equipment Identity) or IMSI (International Mobile Subscriber Identity), for example. The IMEI is a unique number in a subscriber terminal. The IMSI is also a unique number but it is stored in the SIM (Subscriber Identity Module) inside the phone. The information may alternatively or additionally include an algorithm in a form of a computer program. The algorithm may include a sequence of commands to control operations such as forming of acknowledgement messages in different situations.

The receiver 200 may transmit information on its acknowledgement messaging to the intermediate station 2024. The intermediate station 2024 may then form and transmit an acknowledgement message emulating that of the receiver 200 to the transmitter 204 in response to a reception of at least one data packet transmitted by the transmitter 204 and addressed to the receiver 200.

The intermediate station 2024 may be any sort of node or station in a radio system and it may reside in a satellite 2022, in the transmitter 204 or at any position therebetween. The intermediate station 2024, which may be, for example, a base station in a radio system, may use the information for performing signaling of the receiver 200 to the transmitter 204 in conjunction with the data transfer. That is, the intermediate station 2024 may emulate the receiver 200 for the transmitter 204. Hence, the long delay of the roundtrip connection through the satellite 2022 can be replaced with a delay in a terrestrial connection in conjunction with signaling. The delay resulting from the connection between the intermediate station 2024 and the transmitter 204 is or should be less than the delay between the intermediate station 2024 and the receiver 200. The delay in the connection between the intermediate station 2024 and the transmitter 204 may be at least nearly constant.

To initiate data transfer, the information may be used in negotiating characteristics of the data transfer during signaling. The characteristics may include data transfer protocols, data compression methods, reservation of a bandwidth, etc.

The transmitter 204 may start the data transfer by transmitting at least one data packet, whose destination is the receiver 200, to the intermediate station 2024. The transmitter 204 and the intermediate station 2024 may be coupled to each other through a data network 2026, such as an IP network. When the intermediate station 2024 receives the at least one data packet addressed to the receiver 200 from the transmitter 204, the intermediate station 2024 recognizes the address and transmits each data packet to the receiver 200. Additionally, the intermediate station 2024 performs signaling by transmitting an acknowledgement message of the receiver 200 to the transmitter 204 in conjunction with the data transfer. The intermediate station 2024 may also transmit a non-acknowledgement message of the receiver 200 to the transmitter 204, if the intermediate station 2024 does not receive a data packet properly during the data transfer.

Figure 3:
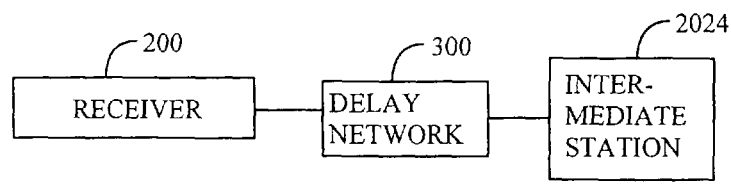
FIG. 3 illustrates a delay network whose transit time is long.

FIG. 3 presents a possible delay network. Instead of a satellite connection, signaling and/or transfer of each data packet may be performed through a delay network 300 having a transit delay longer than about a second, the network 300 residing between the receiver 200 and the intermediate station 2024. The network 300 may be a wireless terrestrial network whose connections are established between a plurality of nodes. Due to the connections over multiple nodes, the delay may be long and/or undetermined but the problem associated with the delay can be alleviated by the at least one described embodiment.

Figure 4:
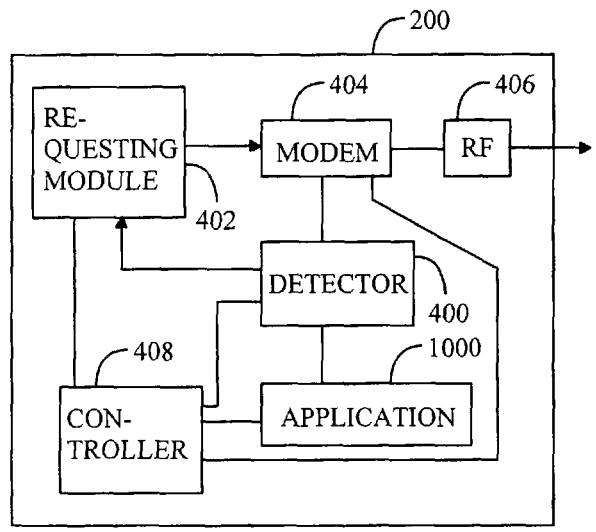
FIG. 4 shows a receiver.

FIG. 4 illustrates the receiver. The receiver 200 comprises an application layer 1000 similar to that in FIG. 1. The receiver 200 also comprises a detector 400 and a requesting module 402. The detector 400, which may be an IP stack, detects a faulty reception of a data packet and forms a non-acknowledgement signal in case of a faulty reception of a data packet. The detector 400 feeds the non-acknowledgement message to the requesting module 402. The requesting module 402, in turn, forms a retransmission request message if it receives a non-acknowledgement message from the detector 400. The detector 400 may also form an acknowledgement message and feed it to the requesting module 402. If the requesting module receives the acknowledgement message or does not receive the non-acknowledgement message, the requesting module 402 does not form a retransmission request message and need not transmit an acknowledgement message associated with the received data packet to the transmitter 2024.

If the retransmission request message is formed, the requesting module 402 transmits the retransmission request message to the network 202 through a modem 404 and the RF output 406, which may be an antenna or a connector to the network 202. A controller 408 may comprise a processor and a memory of its own. Additionally the controller 408 may comprise a suitable computer program comprising instructions for executing the operations for controlling the operation of the receiver 200. The controller 408 may control, for example, the forming and feeding of the non-acknowledgement message and the forming and transmission of the retransmission request message.

Figure 5:
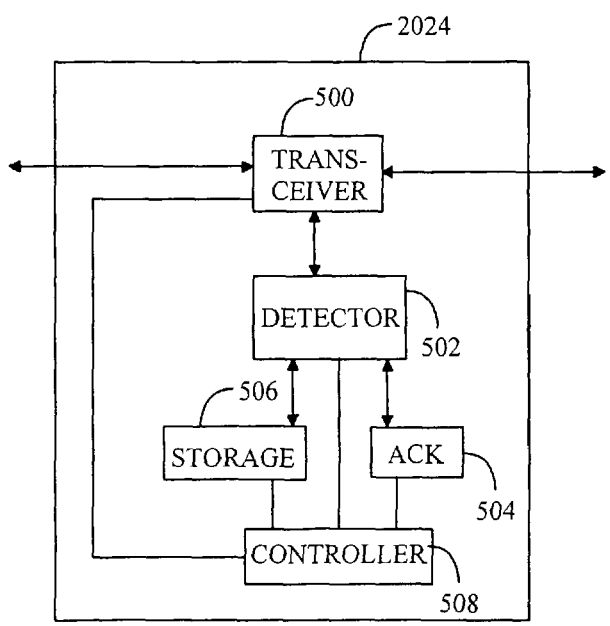
FIG. 5 shows an intermediate station.

FIG. 5 presents the intermediate station 2024. When the transmitter 204 is transmitting data packets bound to the receiver 200, a transceiver 500 of the intermediate station 2024 receives at least one of the data packets. Each data packet is checked in a detector 502 which detects whether each data packet arrives at the intermediate station 2024 properly. The detector 502 feeds a detection signal of a properly received data packet to a generator 504 which forms an acknowledgement message associated with each properly received data packet. The generator 504 transmits each acknowledgement message through the transceiver 500 and a possible data network 2026 to the transmitter 204.

The intermediate station 2024 may comprise a memory 506 which saves each data packet for a predetermined period longer than the transit delay of the delay network 300. If a request for retransmission message associated with a data packet is received in the transceiver 500 of the intermediate station 2024, a corresponding saved data packet is transmitted through the transceiver 500 to the receiver 200 in response to the retransmission request. A controller 508 may comprise a processor and a memory of its own. Additionally, the controller 508 may comprise a suitable computer program comprising instructions for controlling the intermediate station 2024. The controller 508 may control, for example, the forming and transmission of the acknowledgement message of the receiver 200 to the transmitter 204.

Figure 6:
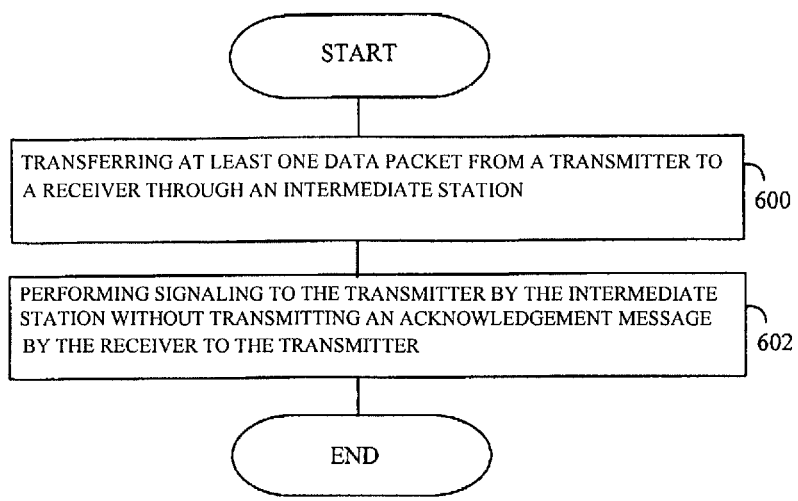
FIG. 6 shows a flow chart of the method.

FIG. 6 shows a flow chart of the method. In step 600, at least one data packet is transferred from a transmitter to a receiver through an intermediate station. In step 602, signaling of the receiver to the transmitter is performed by the intermediate station in conjunction with the data transfer.

Figure 7:
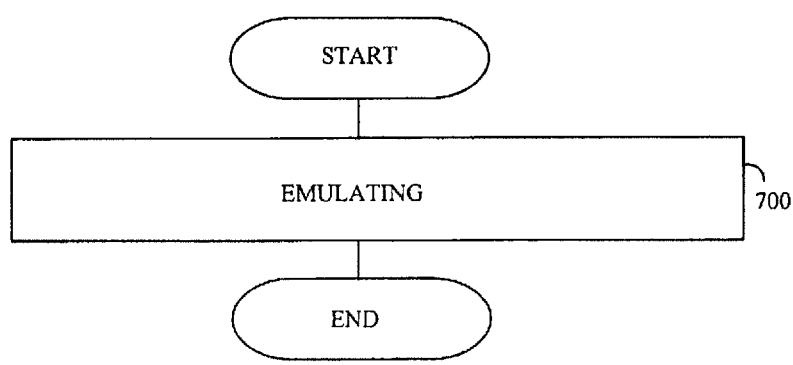
FIG. 7 shows a flow chart of a process of an intermediate station.

FIG. 7 illustrates a flow chart of the computer program for the intermediate station 2024. In step 700, signaling of the receiver to the transmitter is emulated by the intermediate station in conjunction with the data transfer of at least one data packet from the transmitter to the receiver through the intermediate station.

Figure 8:
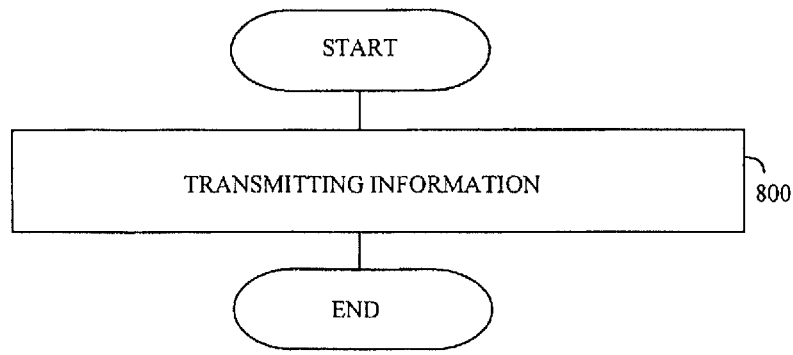
FIG. 8 shows a flow chart of a process of a receiver.

FIG. 8 illustrates a flow chart of the computer program for the receiver 200. In step 800, information on a receiver is transmitted by the receiver of at least one data packet to an intermediate station, the information being for performing signaling of the receiver from the intermediate station to the transmitter in conjunction with data transfer.

The controller 508 may be configured to perform at least some of the steps described in connection with the flowchart of FIG. 7. The controller 408 may be configured to perform at least some of the steps described in connection with the flowchart of FIG. 8. The embodiments may be implemented as computer programs comprising instructions for execution of signaling.

The computer programs may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A data transfer method which compensates for delays in transmissions caused by faulty reception of data packets using information to negotiate characteristics of the data transfer, the method comprising:

transferring identity of a subscriber terminal from the subscriber terminal to an intermediate station associated with a radio system;

transferring at least one data packet from a transmitter to the subscriber terminal through the intermediate station;

negotiating characteristics of the data transfer during transferring the at least one data packet to compensate for delays in transmission and retransmission, the characteristics comprising at least one of data transfer protocol, bandwidth reservation, and data compression method;

saving each data packet in the intermediate station;

detecting a faulty reception of a data packet in the subscriber terminal;

transmitting, from the subscriber terminal, initiating a request for retransmission of the data packet associated with the faulty reception in response to a message indicating faulty reception;

retransmitting, from the intermediate station to the subscriber terminal, a saved data packet in response to the request caused by faulty reception of the data packet using the negotiated data transfer characteristics; and performing signaling of the subscriber terminal to the transmitter by the intermediate station including data transfer according to the negotiated data transfer characteristics, the signaling being an emulation of an information response message ordinarily sent by a receiver to the transmitter, with an emulated information response message sent by the intermediate station in place of the transmitter in response to reception of the at least one data packet of data packet protocol context transmitted by the transmitter and addressed to the subscriber terminal and received by the receiver, the emulation being based on the identity of the subscriber terminal transferred to the intermediate station, wherein the subscriber terminal is coupled to the intermediate station through a delay network comprising an undetermined delay of about at least a second, the transmitter being coupled to the intermediate station through a connection comprising a nearly constant delay that is shorter than that of the delay network, thereby compensating for delays in transmissions caused by faulty reception of data packets using information to negotiate characteristics of the data transfer.

2. The method of claim 1, the method further comprising:
transmitting at least one data packet, a destination of which is the subscriber terminal, from the transmitter to the intermediate station;
performing signaling by transmitting an acknowledgement message of the subscriber terminal from the intermediate station to the transmitter in response to reception of the at least one data packet; and
transmitting the at least one data packet from the intermediate station to the subscriber terminal.

3. The method of claim 1, the method further comprising transmitting the information on identity of the subscriber terminal from the subscriber terminal to the intermediate station.

4. The method of claim 1, the method further comprising receiving in the intermediate station the information from a storage including information associated with at least one subscriber terminal.

5. The method of claim 1, the method further comprising transferring each data packet through a delay network having a transit delay longer than about a second, the delay network residing between the subscriber terminal and the intermediate station.

6. The method of claim 5, the method further comprising transferring each data packet through a satellite in the delay network.

7. An intermediate station in a radio system, wherein the intermediate station is configured to:
receive an identity of a subscriber terminal from the subscriber terminal;
transfer at least one data packet between a transmitter and the subscriber terminal;
negotiate characteristics of the data transfer during transferring the at least one data packet to compensate for delays in transmission and retransmission, the characteristics comprising at least one of data transfer protocol, bandwidth reservation, and data compression method;
save each data packet in the intermediate station;
transmit, to the subscriber terminal, a saved data packet in response to a request for retransmission of the data packet associated with the faulty reception of the data packet in the subscriber terminal;
retransmit, from the intermediate station to the subscriber terminal, a saved data packet in response to the request caused by faulty reception of the data packet using the negotiated data transfer characteristics: and
perform signaling of the subscriber terminal to the transmitter including the data transfer according to the negotiated data transfer characteristics, the signaling being an emulation of an information response message ordinarily sent by a receiver to the transmitter, with an emulated information response message sent by the intermediate station in place of the transmitter in response to reception of the at least one data packet of data packet protocol context transmitted by the transmitter and addressed to the subscriber terminal and received by the receiver, the emulation being based on the identity of the subscriber terminal transferred to the intermediate station, wherein the subscriber terminal is coupled to the intermediate station through a delay network comprising an undetermined delay of about at least a second, the transmitter being coupled to the intermediate station through a connection comprising a nearly constant delay that is shorter than that of the delay network, thereby compensating for delays in transmissions caused by faulty reception of data packets according to the negotiated data transfer characteristics.

8. The intermediate station of claim 7, wherein the intermediate station comprises an acknowledgement module, the intermediate station being configured to receive at least one data packet addressed to the subscriber terminal from the transmitter and transmit the at least one data packet to the subscriber terminal, the acknowledgement module being configured to transmit a reception acknowledgement message of the subscriber terminal to the transmitter in response to reception of the at least one data packet.

9. The intermediate station of claim 7, wherein the intermediate station is configured to receive the information on the identity of the subscriber terminal from a storage including information associated with at least one subscriber terminal.

10. The intermediate station of claim 7, wherein the intermediate station is configured to transmit each data packet through a delay network having a transit delay longer than about a second to the subscriber terminal.

11. The intermediate station of claim 10, wherein the intermediate station is configured to transmit each data packet through a satellite in the delay network.

12. The intermediate station of claim 10, wherein the intermediate station comprises a memory configured to save each data packet for a predetermined period longer than the transit delay of the delay network.

13. The intermediate station of claim 7, wherein the intermediate station is a base station.

14. A subscriber terminal in a radio system, wherein the subscriber terminal in a data transfer of at least one data packet from a transmitter through an intermediate station is configured to:
negotiate characteristics of the data transfer during transferring the at least one data packet to compensate for delays in transmission and retransmission, the characteristics comprising at least one of data transfer protocol, bandwidth reservation, and data compression method;
transmit information on identity of the subscriber terminal from the subscriber terminal to the intermediate station, the information being for signaling including data transfer according to the negotiated data transfer characteristics, the signaling being an emulation of an information response message ordinarily sent by the subscriber terminal to a transmitter in response to reception of the at least one data packet of data packet protocol context transmitted by the transmitter and addressed to the subscriber terminal and received by a receiver, the emulation being based on the identity of the subscriber terminal transferred to the intermediate station;
detect a faulty reception of a data packet in the subscriber terminal;
transmit as initiated from the subscriber terminal, a request for retransmission of the data packet associated with the faulty reception to the intermediate station in response to a message indicating faulty reception;
retransmit, from the intermediate station to the subscriber terminal, a saved data packet in response to the request caused by faulty reception of the data packet using the negotiated data transfer characteristics: and
receive, from the intermediate station, the data packet saved in the intermediate station in response to the request caused by faulty reception of the data packet, wherein the subscriber terminal is coupled to the intermediate station through a delay network comprising an undetermined delay of about at least a second, the transmitter being coupled to the intermediate station through a connection comprising a nearly constant delay that is shorter than that of the delay network, thereby compensating for delays in transmissions caused by faulty reception of data packets according to the negotiated data transfer characteristics.

15. The subscriber terminal of claim 14, wherein the subscriber terminal is configured to transmit information associated with acknowledgement messaging of the subscriber terminal to the intermediate station for the intermediate station to form and transmit an acknowledgement message of the subscriber terminal to the transmitter in response to reception of at least one data packet transmitted by the transmitter and addressed to the subscriber terminal, the subscriber terminal being configured to receive, without transmitting the acknowledgement message to the transmitter, the at least one data packet addressed to the subscriber terminal from the transmitter.

16. The subscriber terminal of claim 14, wherein the subscriber terminal is configured to receive each data packet through a delay network having a transit delay longer than a second.

17. The subscriber terminal of claim 16, wherein the subscriber terminal is configured to receive each data packet from the intermediate station through a satellite in the delay network.

18. The subscriber terminal of claim 16, wherein the subscriber terminal comprises a detector configured to detect faulty reception of a packet and a requesting module configured to transmit a retransmission request message if the detector detects faulty reception of the packet, the subscriber terminal being configured to receive a retransmitted data packet stored in a memory for a predetermined period longer than the transit delay in the delay network.

19. A radio system, the radio system comprising:
   a transmitter;
   an intermediate station; and
   a subscriber terminal for a data transfer from the transmitter to the subscriber terminal, the transmitter being configured to transmit data packets, the subscriber terminal being configured to receive data packets from the transmitter via the intermediate station, to detect a faulty reception of a data packet, and to transmit a request for retransmission of the data packet associated with the faulty reception, negotiate characteristics of the data transfer during transferring at least one data packet to compensate for delays in transmission and retransmission, the characteristics comprising at least one of data transfer protocol, bandwidth reservation, and data compression method, the intermediate station being configured to receive the subscriber terminal identity from the subscriber terminal, to receive the at least one data packet addressed to the subscriber terminal from the transmitter, save each data packet in the intermediate station, transmit the at least one data packet to the subscriber terminal, retransmit a saved data packet in response to the request for retransmission caused by faulty reception of the data packet using the negotiated data transfer characteristics, and perform signaling of the subscriber terminal to the transmitter by the intermediate station including data transfer according to the negotiated data transfer characteristics, the signaling being an emulation of an information response message ordinarily sent by a receiver to the transmitter, with an emulated information response message sent by the intermediate station in place of the transmitter in response to reception of the at least one data packet of data packet protocol context transmitted by the transmitter and addressed to the subscriber terminal and received by the receiver, the emulation being based on identity of the subscriber terminal transferred to the intermediate station, wherein the subscriber terminal is coupled to the intermediate station through a delay network comprising an undetermined delay of about at least a second, the transmitter being coupled to the intermediate station through a connection comprising a nearly constant delay that is shorter than that of the delay network, thereby compensating for delays in transmissions caused by faulty reception of data packets according to the negotiated data transfer characteristics.

20. A non-transitory computer readable medium comprising a computer program of instructions that, when executed by a computer device, perform a computer process for signaling associated with a data transfer between a transmitter and a subscriber terminal through an intermediate station, the computer process comprising:
   controlling reception of an identity of the subscriber terminal from the subscriber terminal to the intermediate station;
   negotiating characters of the data transfer during transferring at least one data packet to compensate for delays in transmission and retransmission, the characteristics comprising at least one of data transfer protocol, bandwidth reservation, and data compression method;
   transmitting as initiated from the subscriber terminal, a request for retransmission of the data packet associated with the faulty reception in response to a message indicating faulty reception;
   emulating signaling of the subscriber terminal to the transmitter by the intermediate station including data transfer of the at least one data packet from the transmitter to the subscriber terminal through the intermediate station according to the negotiated data transfer characteristics, the signaling being an emulation of an information response message ordinarily sent by a receiver to the transmitter, with an emulated information response message sent by the intermediate station in place of the transmitter in response to reception of the at least one data packet of data packet protocol context transmitted by the transmitter and addressed to the subscriber terminal and received by the receiver, the emulation being based on the identity of the subscriber terminal received in the intermediate station, wherein the subscriber terminal is coupled to the intermediate station through a delay network comprising an undetermined delay of about at least a second, the transmitter being coupled to the intermediate station through a connection comprising a nearly constant delay that is shorter than that of the delay network;
   saving each data packet in the intermediate station; and
   controlling a retransmission of a saved data packet from the intermediate station to the subscriber terminal in response to a request for a retransmission based on a detection of a faulty reception of a data packet in the subscriber terminal, thereby compensating for delays in transmissions caused by faulty reception of data packets according to the negotiated data transfer characteristics.

21. The non-transitory computer readable medium of claim 20, wherein the non-transitory computer readable medium includes at least one of the following media: a computer readable medium, a program storage medium, a record medium, a computer readable memory, a computer readable software distribution package, a computer readable compressed software package.

* * * * *